Sept. 17, 1968  B. F. VISSER  3,401,553
METHOD AND DEVICE FOR DETERMINING THE OXYGEN AND
CARBONIC ACID CONTENT IN A GAS MIXTURE
Filed Aug. 4, 1964  2 Sheets-Sheet 1
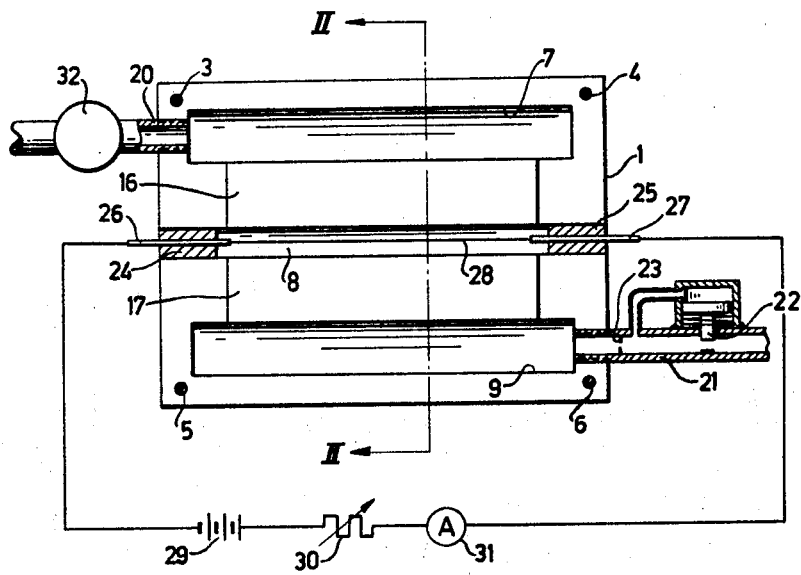
FIG:1.
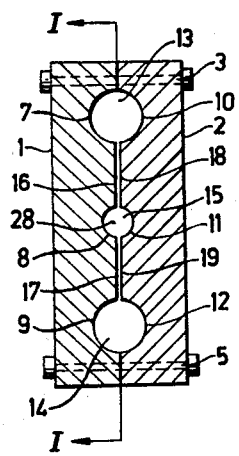
FIG:2.
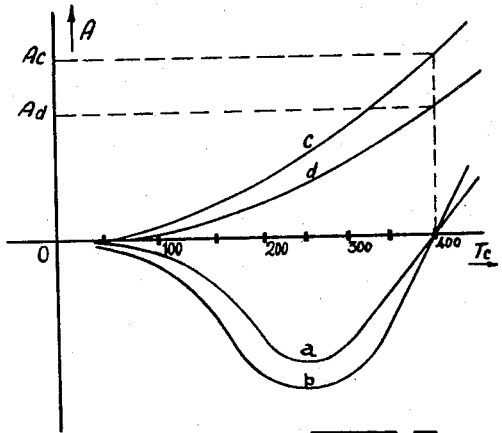
FIG:3.

United States Patent Office 3,401,553
Patented Sept. 17, 1968

3,401,553
METHOD AND DEVICE FOR DETERMINING THE OXYGEN AND CARBONIC ACID CONTENT IN A GAS MIXTURE
Bernardus Frederikus Visser, Mauritsstraat 2, Utrecht, Netherlands
Filed Aug. 4, 1964, Ser. No. 387,313
Claims priority, application Netherlands, Aug. 9, 1963, 296,499
3 Claims. (Cl. 73—27)

The present invention relates to a method for determining the oxygen and carbonic acid contents in a gas mixture, especially for clinical gas analysis.

A method for effecting the above determinations is known, for example, as disclosed in my Dutch Patent 95,702, wherein a quantity of the gas mixture is regularly passed transversely through an oblong measuring chamber of substantially constant cross section having a thin wire of temperature dependent resistance heated by electric current stretched longitudinally in such chamber, and the gas content to be determined is deduced from the measured resistance of the wire. In the known method the gas mixture is passed through the measuring chamber with a linear velocity of more than 1 cm./sec. and the pressure of the gas mixture in the measuring chamber is maintained at less than 0.125 atmosphere, while the average temperature of the measuring wire, for determining the carbonic acid content, is adjusted to a value which is so low that a changing oxygen content does not influence the resistance of the wire.

Such known method is adavntageous in that measurements can be effected with a very small delay. Conclusion as to the composition of the gas mixture should be based on calibration of the meter or other device by which changes of the resistance of the wire are measured. The change of the resistance of the measuring wire depends in general on the adjusted average wire temperature, on the flow velocity at which the examined gas mixture passes the wire, and on the percentages of all components in the gas mixture. The interpretation of the results of the measurement is in general difficult, although it has appeared to be possible to find such a combination of wire temperatures and rate of gas flow that a changing oxygen percentage has no influence, so that only the carbonic acid content is measured.

The principal object of my present invention is to simplify the method and the interpretation of the results of the measurements of both the carbonic acid and oxygen contents. As regards the latter, I have found that the change of resistance of the wire which is produced when air in the measuring chamber is replaced by a definite percentage of carbonic acid in air is so related to the wire temperature that, at a certain high temperature of the wire, no further change of resistance results from the presence of the carbonic acid. In the event of a different percentage of carbonic acid the zero passage of the measuring characteristic will in general correspond to another wire temperature. Thus, it is possible to have the zero passages of the carbonic acid characteristics coincide over a range of 0 to 10% carbonic acid in air.

It is a further object of the invention to obtain a stabilization of the rate of gas flow through the measuring chamber and consequently to stabilize the indication of the meter or other measuring instrument.

Another object is to obtain an amplification of the indication afforded by the meter when determining the carbonic acid content.

Still another object is to determine simultaneously the content of oxygen and carbonic acid in air, so that it becomes possible with the aid of a recording instrument, to simply obtain $O_2/CO_2$ diagrams, which furnish the physician with information about the patient being examined.

The invention further relates to a device for performing the method described hereinbefore, and it is therefore another object of the invention to provide such a device which is of simple construction and which is handy and reliable in use.

Other objects, and the manner in which they may be realized, will appear from the following detailed description, which is to be read in connection with the accompanying drawings, in which embodiments of gas analyzing devices in accordance with the invention are illustrated.

In the drawings:

FIGURE 1 is a cross section on the line I—I in FIGURE 2 showing a device in accordance with a first embodiment of the invention.

FIGURE 2 shows a cross section on the line II—II in FIGURE 1.

FIGURE 3 shows some graphs representing the indication of the measuring instrument as a function of the wire temperature.

Figure 4:
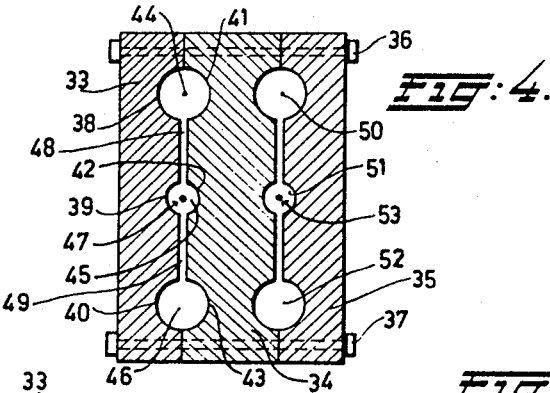
FIGURE 4 is a vertical sectional view taken along the line IV—IV on FIGURE 5, and showing another embodiment of the invention.

The device shown on FIGS. 1 and 2 consists of two blocks 1 and 2, which are secured to each other by means of bolts 3, 4, 5 and 6. Provided in each of the blocks 1 and 2 are three semicylindrical recesses 7, 8, 9 and 10, 11, 12, respectively. The recesses 7 and 10 and the recesses 9 and 12 are complementary to each other so as to form cylindrical cavities 13, 14 with a diameter of about 5 mm., the recesses 8 and 11 forming together a cylindrical bore 15 with a diameter of 3 mm. which extends through the assembled blocks 1 and 2.

Situated between the recesses 7, 8 and 9 are two faces 16 and 17 of the block 1 and situated between the recesses 10, 11 and 12 are two faces 18 and 19 of the block 2. When the blocks 1 and 2 are assembled together and bear, at their edges, against each other, the faces 16, 17 are spaced about 0.5 mm. from the faces 18, 19, respectively.

Protruding from the assembled blocks 1 and 2 and communicating with the cavities 13, 14 are tubes 20, 21 respectively. In operation the tube 20 is connected to an air pump or a space in which an air pressure of less than 0.125 atmosphere, e.g., 0.1 atmosphere, exists or is maintained. The tube 21 is provided with a pressure regulating valve 22, which maintains the pressure at a diaphragm 23 in tube 21 at a constant value. The end of tube 21 remote from cavity 14 is, in operation, connected to a space in which a gas to be examined is present, e.g., expiratory air of about atmospheric pressure. In order to achieve an indication delay of less than 1 sec. the opening of diaphragm 23 should be so small that no more than 5 cm.³ of gas at atmospheric pressure can enter per second.

When the blocks 1 and 2 are secured to one another by means of the bolts 3–6, the engaged edges of the blocks are hermetically sealed by means of a suitable intermediate layer, and the ends of the cylindrical bore 15 are closed in an air-tight way by means of plugs 24 and 25, through which conductors 26 and 27 extend. Stretched between these conductors is a thin metal wire 28 of 15 to 25 micron thickness. This wire is preferably made of platinum, which of all metals has the highest temperature coefficient of electrical resistance, and is moreover not liable to corrosion, so that the surface condition which is decisive for the radiated heat is unchangeable.

When measuring, there is made to flow through wire 28 which is derived from a source of current 29 and which an electric current passes through an adjustable resistor 30 and a current meter 31, the resistance of the wire being deduced from the deflection of the latter. Obviously this resistance can also be determined in another way, for instance by means of a Wheatstone bridge.

The curves represented in FIG. 3 show diagrammatically how the deflection of the meter 31 or other measuring instrument changes as a function of the adjusted wire temperature. The curves $a$ and $b$ represent this relationship for different finite percentages of carbonic acid in air, and the curves $c$ and $d$ refer to different finite percentages of oxygen in air. The measurement of carbonic acid independently of the oxygen content should be effected at a low temperature at which the curves representing the characteristics of various percentages of oxygen, as at $c$ and $d$, almost coincide with the abscissa. The progress of these characteristic curves depends on the gas flow. At a sufficiently low temperature, however, a suitable value of the gas flow can be found, at which 100% oxygen produces no different deflection of the meter than does air. As shown in FIG. 3, this temperature is approximately 50°C. The sensitivity to a certain percentage of carbonic acid in air/oxygen mixtures then varies no more than about 2% of the average measured value when the oxygen content varies from 0 to 100%.

For various percentages of carbonic acid the shape of the characteristic curves will roughly be the same, however, with a different zero passage. The wire temperatures at which the characteristics intersect the abscissa also depend on the gas flow. At the gas flow value which has been found to be suitable for the carbonic acid measurement, and which can be adjusted through the regulating valve 22, a high value of the wire temperature can be found, at which there is coincidence of the zero passages of the characteristics for carbonic acid contents which vary from 0 to 10%. When the device is adjusted to the values of gas flow and wire temperature obtained in this way, a varying percentage of carbonic acid does not influence the measurement of the wire resistance, so that only the oxygen content is ascertained from such measurement. For example, $A_c$ and $A_d$ will be the deflections of the meter measuring the wire resistance for different oxygen contents when the instrument is adjusted to the right combination of gas flow and wire temperature.

For an instrument with the dimensions mentioned, and which is provided with a platinum wire of a length of 6 cm., it appears that the average wire temperature for the determination of oxygen content should be 400° C. at a gas flow of 5 cm.$^3$ (atmospheric pressure) per second. In this connection it should be noted that the average wire temperature which is here given as suitable for the determination of oxygen content, is simply determined from the resistance of the wire. The wire thickness practically only influences the response time. With a wire thickness of 20 microns the 90% response time is 0.15 sec.

In order to determine the oxygen content in the way described hereinbefore without such determination being substantially affected by a changed carbonic acid content, it is only necessary that the passage for the gas flow at the entry side of the instrument be adjusted to the right value. The provision of the diaphragm 23 is not necessary for this purpose, but such diaphragm is advantageous in that the gas on leaving the aperture of the valve 22 thereby attains the velocity of sound. As is known, the gas flow is then independent of the counter pressure, because the latter is under 0.53 atmosphere. Thus, the gas flow is stabilized and this is particularly advantageous because, at the required high wire temperature for determining the oxygen content, the deflection of the meter 31 depends to a considerable extent on the gas flow. In this way a stable indication is obtained.

In order to attain the velocity of sound one might use, instead of the combination of a diaphragm and a pressure regulating valve, a needle valve, the needle of which is directed toward the entrance side. Such a valve would have two disadvantages. In the first place it would be susceptible to dust, because the space between the needle and the needle seat would be very narrow to permit the passage of the required small quantity of gas and this space would be of the same order of magnitude as dust. In the second place, although the volume of the gas passed would indeed be independent of the pressure difference because of the very low pressure inside the measuring chamber, the weight of the gas passed would still depend on the actual pressure at the entry or inlet side of the valve. Therefore it is useful for regulating the flow to provide a diaphragm with an opening having a sufficiently sharp circumference to produce the velocity of sound in the gas stream, together with a constant pressure valve, as is schematically represented in the drawing. In that way, the measurements of carbonic acid content and oxygen content are made entirely independent of the variations in atmospheric pressure; a simple central opening in the diaphragm is less sensitive to dust than a needle valve; the tolerances for the dimensions of this opening are of no importance, as the valve is able to correct therefor; and finally the combination of a diaphragm and a pressure regulating valve is no more complicated, structurally speaking, than the needle valve which would otherwise be required.

A further advantage of providing a gas inlet whereby the gas flow attains the velocity of sound is the amplification of the measuring deflection that is thereby obtained when determining the carbonic acid content irrespective of oxygen. This is based on the following phenomena. The quantity of gas flowing through the aperture of diaphragm per unit time, is reciprocally proportional to the square root of the molecular weight. The light gases He and $N_2$ will therefore, as compared to air, result in a higher flow rate and the heavy gases $O_2$ and $CO_2$ will result in a slower flow rate. The wire temperature decreases when more gas passes by, for example, as in the presence of He or $N_2$, and conversely the wire temperature increases in the presence of $O_2$ or $CO_2$, because the latter gases flow in smaller quantities past the wire.

The heat conductivity of the passing gases also influences the temperature of the wire. He and $O_2$ have a greater conductivity than air, and $N_2$ and $CO_2$ have a lower conductivity. For the former gases the temperature of the wire will be lower than for the latter.

All these influences are summarized in Table 1, in which F represents the gas flow, $T_f$ represents the temperature as influenced by the gas flow, $\lambda$ represents the heat conductivity and $T_\lambda$ the influence of $\lambda$ on the temperature. A $+$ sign means a higher value and a $-$ sign a lower value than in air of normal composition. Finally, T represents the combined influence on the wire temperature of the gas flow and the heat conductivity.

TABLE 1

|   | $N_2$ | $O_2$ | $CO_2$ | He |
|---|---|---|---|---|
| F | + | − | − | + |
| $T_f$ | − | + | + | − |
| $\lambda$ | − | + | − | + |
| $T_\lambda$ | + | − | + | − |
| T | ± | ± | ++ | −− |

It is obvious from the table that both factors for He and $CO_2$ act in the same direction and counteract one another for $N_2$ and $O_2$. It has been possible to adjust the device so that both counteracting factors cooperate to cause the same meter deflection for 100% oxygen as for air.

In the measuring devices previously used and in which a narrow capillary constitutes the entry for the gases to the measuring chamber, the equalization of the meter deflections for pure oxygen and for air could also be obtained by a suitable selection of wire temperature and capillary dimensions. In that case the indication is determined by the conductivity $\lambda$ of the gas and by the viscosity $\eta$. A higher value of the latter factor results in a decrease of the gas flow F through the capillary, whereby the wire temperature is increased. The phenomena which arise are summarized in Table 2.

TABLE 2

|   | $N_2$ | $O_2$ | $CO_2$ | He |
|---|---|---|---|---|
| $\eta$ | − | + | − | + |
| $F$ | + | − | + | − |
| $T$ | − | + | − | + |
| $\lambda$ | − | + | − | + |
| $T_\lambda$ | + | − | + | − |
| $T$ | ± | ± | ± | ± |

The two influencing factors counteract each other for all gases, which results in a low deflection of the instrument. When the influence of the viscosity is eliminated by using an opening in which the velocity of sound is attained, as described, instead of a capillary at the entry, the deflection of the instrument for $CO_2$ irrespective of oxygen is amplified by about 20%. Since this measurement of $CO_2$ content without influence from the oxygen content can only be effected at a low wire temperature, the deflection of the instrument is small for the measurement of $CO_2$ as is evident from FIGURE 3. The amplification of 20% due to the use of the diaphragm 23 should therefore be considered as an important asset.

It should be noted that the values of $\lambda$ for gases like helium, argon and $SF_6$ differs so much from the values for oxygen, nitrogen, carbonic acid and hydrogen that, when the gases of the first group are present in sufficiently high concentrations, the measurement becomes practically specific, so that these special gases can be measured at any arbitrary wire temperature.

The value of the gas flow, as determined by the sizes of the passage through diaphragm 23 and valve 22, can be adjusted once in the way described hereinbefore. The device can be constructed in such a way that, for example, by means of series resistances or the like, the two wire temperatures to be employed for determining the carbonic acid and oxygen contents, respectively, can be simply obtained by turning an electrical switch. The carbonic acid and oxygen measurements can then be performed consecutively at a fast rate.

The correct adjustment of the apparatus bears hardly any relation to the pressure but depends largely on the gas flow. It is therefore desirable to provide means by which the adjustment of the gas flow can be verified. This can be effected by connecting a manometer in the discharge duct 20 exiting from the measuring block. The pressure indicated by this manometer is representative of the flow, however, only in the event that the vacuum pump is of definite capacity. When a pump with a greater capacity is used, the pressure at the entry of the pump can be reduced by providing, between the pump and the block 1, 2, a narrowing, e.g., in the form of a needle valve, as is schematically represented by 32, whereby the effective capacity of the pump is suitably reduced. The needle valve can then be adjusted in such a way that the pressure indicated by the manometer corresponds again to the desired gas flow.

Since not all pumps of the same type have exactly the same capacity, it is advantageous from the technical point of view to have the possibility to adjust various devices in relation to the supplied pump in such a manner that in the directions for use a fixed value for the pressure can be indicated, the said value then being a measure for the right flow value. Due to this fact the manometer can directly be provided with a scale for the flow values.

It is also possible to simultaneously carry out the determinations of the carbonic acid and oxygen contents through the use of two devices of the kind described above. The two devices used for the simultaneous determinations are identical and adjusted so as to have the same rate of gas flow therethrough. However, the wire temperature of one device is adjusted to the value which permits the determination of the oxygen content independently of the carbonic acid content, and the wire temperature of the other device is adjusted to the value which permits the determination of the carbonic acid content independently of the oxygen content.

Figure 5:
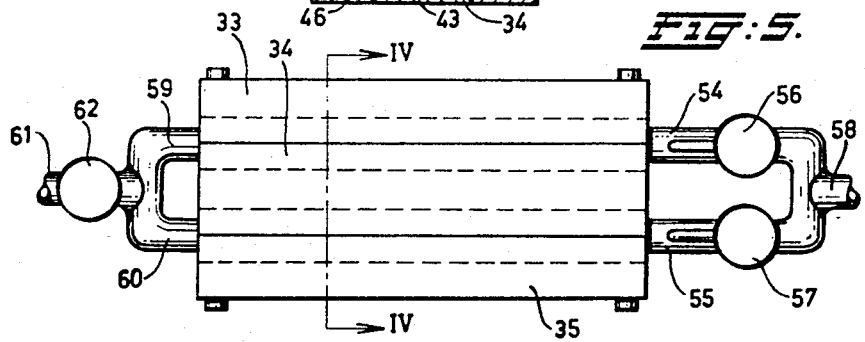
FIGURE 5 is a top plan view of the embodiment of FIGURE 4.

FIGS. 4 and 5 illustrate, by way of example, two such devices for effecting simultaneous determination of the carbonic acid and oxygen contents, and which are combined in a single apparatus. Such apparatus is shown to comprise an outer block 33, a middle block 34 and an outer block 35 secured together by bolts 36, 37. Semi-cylindrical recesses 38, 39 and 40 in the inner face of block 33 cooperate with complementary recesses 41, 42 and 43, respectively, in the confronting face of middle block 34 to define cylindrical cavities 44, 45 and 46. The central cavity or bore 45 constitutes the measuring chamber in which the wire 47 of temperature dependent resistance is extended longitudinally. The confronting faces of blocks 33 and 34 are spaced apart between cavities 44 and 45 and between cavities 45 and 46, as at 48 and 49.

The confronting faces of middle block 34 and outer block 35 are similarly recessed to define the cylindrical cavities 50, 51 and 52, and the central cavity or bore 51, which constitutes the measuring chamber, has a wire 53 of temperature dependent resistance stretched longitudinally therein. Thus, blocks 33 and 34 cooperate to define one of the devices of the kind illustrated on FIGS. 1 and 2, and blocks 34 and 35 similarly cooperate to define the other of the devices of the same kind.

Tubes 54 and 55, having flow regulating mechanisms 56 and 57 therein similar to the flow regulating mechanisms 22 and 23 previously described, connect the lower cavities 46 and 52, respectively, to a common supply duct 58 for the gas mixture to be tested. The upper cavities 44 and 50 are connected through conduit branches 59 and 60, respectively, to a discharge duct 61 which is provided with a valve mechanism 62 similar to that indicated at 32 on FIG. 1.

Figure 6:
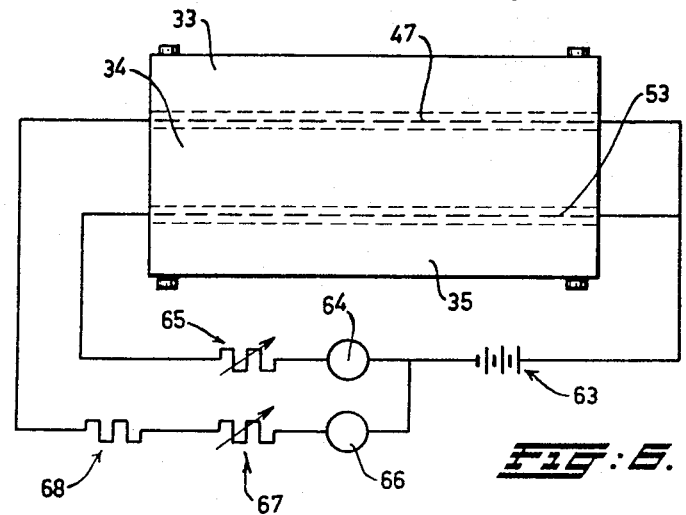
FIGURE 6 is a schematic wiring diagram of the circuits employed with the embodiment of FIGURES 4 and 5.

As shown on FIG. 6, a common source of current is connected, at one side, to wires 47 and 53 and, at the other side, through a current meter 64 and a variable resistor 65 to the wire 53 and through a current meter 66, a variable resistor 67 and an impedance or resistor 68 to the wire 47. The impedance or resistor 68 is shown merely to represent schematically that the temperature of wire 47 is adjusted at a much lower value than that of the other wire 53. Thus, when the gas mixture is passed simultaneously through chambers 45 and 51 having wires 47 and 53, respectively, therein, the deflection of meter 66 is indicative of the carbonic acid content of the mixture independent of the oxygen content and the deflection of the meter 64 is indicative of the oxygen content of the mixture independent of the carbonic acid content. Of course, the gas flows, pressures and wire temperatures are adjusted in the manner previously described with respect to the use of the single device for sequentially determining the carbonic acid and oxygen contents, except that, with the apparatus of FIGS. 4, 5 and 6, such contents are determined simultaneously.

Of course, the meters 64 and 66 shown on FIG. 6 can be replaced by a recording apparatus having two recording stylii which are respectively deflected to indicate the oxygen and carbonic acid contents on a record sheet and thereby afford to a physician an $O_2/CO_2$ diagram from which conclusions may be derived as to the patient's respiration.

Although illustrative embodiments of the invention have been described in detail herein with reference to the accompanying drawings, it is to be understood that the invention is not limited to those precise embodiments and that various changes and modifications may be effected therein by one skilled in the art without departing from the scope or spirit of the invention as defined in the appended claims.

I claim:
1. In the method for determining the oxygen and car- bonic acid contents of a gas mixture by passing the gas mixture transversely through an elongated measuring chamber of substantially constant cross-section which has a thin wire of temperature dependent resistance extending longitudinally in the chamber and being heated by the passage of electric current through the wire, and by measuring the resistance of the heated wire as an indication of the contents of the gas mixture; the steps comprising, regulating the linear velocity of the gas mixture in said measuring chamber to more than 1 cm./sec., maintaining the pressure of said gas mixture in said chamber to a value less than 0.125 atmosphere, adjusting the passage of current through said wire when determining the carbonic acid content of the gas mixture to provide a low average temperature of said wire at which the resistance of said wire is uninfluenced by the oxygen content of the gas mixture, and, when determining the oxygen content of the gas mixture, adjusting the rate of flow of the gas mixture through said chamber to a low value and adjusting the average temperature of said wire to a high value at which low rate of flow and high wire temperature the resistance of said wire is independent of the carbonic acid content of the mixture within the range of from 0% to at least 10%.

2. The method according to claim 1; in which said wire is of platinum and has a length of approximately 6 cm. and said chamber is of circular cross-section with a diameter of approximately 3 mm.; and wherein, for determining the carbonic acid content of the gas mixture, the average temperature of said wire is adjusted to approximately 50° C., and, for determining the oxygen content of the gas mixture, the average temperature of said wire is adjusted to approximately 400° C. and the rate of flow of the gas mixture through said chamber is adjusted to approximately 5 cm.³ (at atmospheric pressure) per second.

3. In the method for determining the oxygen and carbonic acid contents of a gas mixture by passing the gas mixture transversely through an elongated measuring chamber of substantially constant cross-section which has a thin wire of temperature dependent resistance extending longitudinally in the chamber and being heated by the passage of electric current through the wire, and by measuring the resistance of the heated wire as an indication of the contents of the gas mixture; the steps comprising dividing the gas mixture into two sample streams each of which is passed through a respective individual measuring chamber as aforesaid, regulating the linear velocity of the gas mixture in each said measuring chamber to more than 1 cm./sec., maintaining the pressure of said gas mixture in each said measuring chamber to a value less than 0.125 atmosphere, adjusting the passage of current through the wire in one of the measuring chambers to provide a low average temperature of such wire at which the resistance thereof is independent of the oxygen content in the sample stream of the gas mixture passing through said one measuring chamber, and simultaneously adjusting the rate of flow of the other sample stream through the other measuring chamber to a low value and adjusting the average temperature of the wire in said other chamber to a high value at which low rate of flow and high wire temperature the resistance of the wire in said other measuring chamber is independent of the carbonic acid content in said other sample stream within the range from 0% to at least 10%.

References Cited

UNITED STATES PATENTS

| | | | |
|---|---|---|---|
| 1,904,819 | 4/1933 | Blodgett | 73—27 X |
| 2,149,441 | 3/1939 | Jacobson | 73—27 X |
| 2,585,959 | 2/1952 | Minter | 73—27 |
| 2,596,992 | 5/1952 | Fleming | 73—27 |
| 2,734,376 | 2/1956 | Cherry et al. | 73—27 |

FOREIGN PATENTS 95,702 10/1960 Netherlands.

RICHARD C. QUEISSER, *Primary Examiner.*

C. I. McCLELLAND, *Assistant Examiner.*